(12) United States Patent
Sato et al.

(10) Patent No.: US 10,819,882 B2
(45) Date of Patent: Oct. 27, 2020

(54) IMAGE PROCESSING DEVICE AND IMAGING APPARATUS

(71) Applicant: Panasonic Intellectual Property Management Co., Ltd., Osaka (JP)

(72) Inventors: Genki Sato, Osaka (JP); Takeshi Hamasaki, Osaka (JP); Katsuji Kunisue, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 125 days.

(21) Appl. No.: 16/284,888

(22) Filed: Feb. 25, 2019

(65) Prior Publication Data

US 2019/0268504 A1    Aug. 29, 2019

(30) Foreign Application Priority Data

Feb. 28, 2018    (JP) .................................. 2018-035693

(51) Int. Cl.
*H04N 1/60* (2006.01)
*H04N 9/64* (2006.01)

(52) U.S. Cl.
CPC .......... *H04N 1/6061* (2013.01); *H04N 9/646* (2013.01); *H04N 2201/0084* (2013.01)

(58) Field of Classification Search
CPC ................. H04N 1/6061; H04N 9/646; H04N 2201/0084; H04N 9/67; H04N 1/6052; H04N 1/60; H04N 1/648; H04N 1/6072
See application file for complete search history.

(56) References Cited

U.S. PATENT DOCUMENTS

| 2004/0008284 A1* | 1/2004 | Kim ..................... H04N 5/147 348/699 |
| 2011/0012920 A1* | 1/2011 | Saigo ................... H04N 1/6058 345/601 |
| 2011/0249016 A1* | 10/2011 | Zhang ................. G09G 3/2003 345/589 |

(Continued)

FOREIGN PATENT DOCUMENTS

| JP | 2005-318391 A | 11/2005 |
| JP | 2009-218962 A | 9/2009 |

(Continued)

*Primary Examiner* — Nizar N Sivji
(74) *Attorney, Agent, or Firm* — Renner, Otto, Boisselle & Sklar, LLP

(57) ABSTRACT

An image processing device includes: a first color conversion processor configured to perform first color conversion processing on image data; a second color conversion processor configured to perform second color conversion processing on the image data; a coefficient calculator configured to calculate a coefficient indicating a blend ratio between an output of the first color conversion processor and an output of the second color conversion processor; and a blend processor configured to blend the output of the first color conversion processor and the output of the second color conversion processor based on the ratio indicated by the coefficient, wherein the coefficient calculator calculates a position on an xy chromaticity diagram of a color indicated by each pixel in image data processed by the first color conversion processor to determine the coefficient based on a distance from the calculated position to a boundary of a color gamut.

5 Claims, 12 Drawing Sheets

(56) References Cited

U.S. PATENT DOCUMENTS

| | | | | |
|---|---|---|---|---|
| 2014/0176595 A1* | 6/2014 | Takahashi | ................ | G09G 5/02 |
| | | | | 345/590 |
| 2016/0360175 A1* | 12/2016 | Takahashi | ................ | H04N 9/67 |
| 2019/0301941 A1* | 10/2019 | Kawabata | ................ | H04N 1/46 |

FOREIGN PATENT DOCUMENTS

| | | |
|---|---|---|
| JP | 2012-119968 A | 6/2012 |
| JP | 2014-140160 A | 7/2014 |

\* cited by examiner

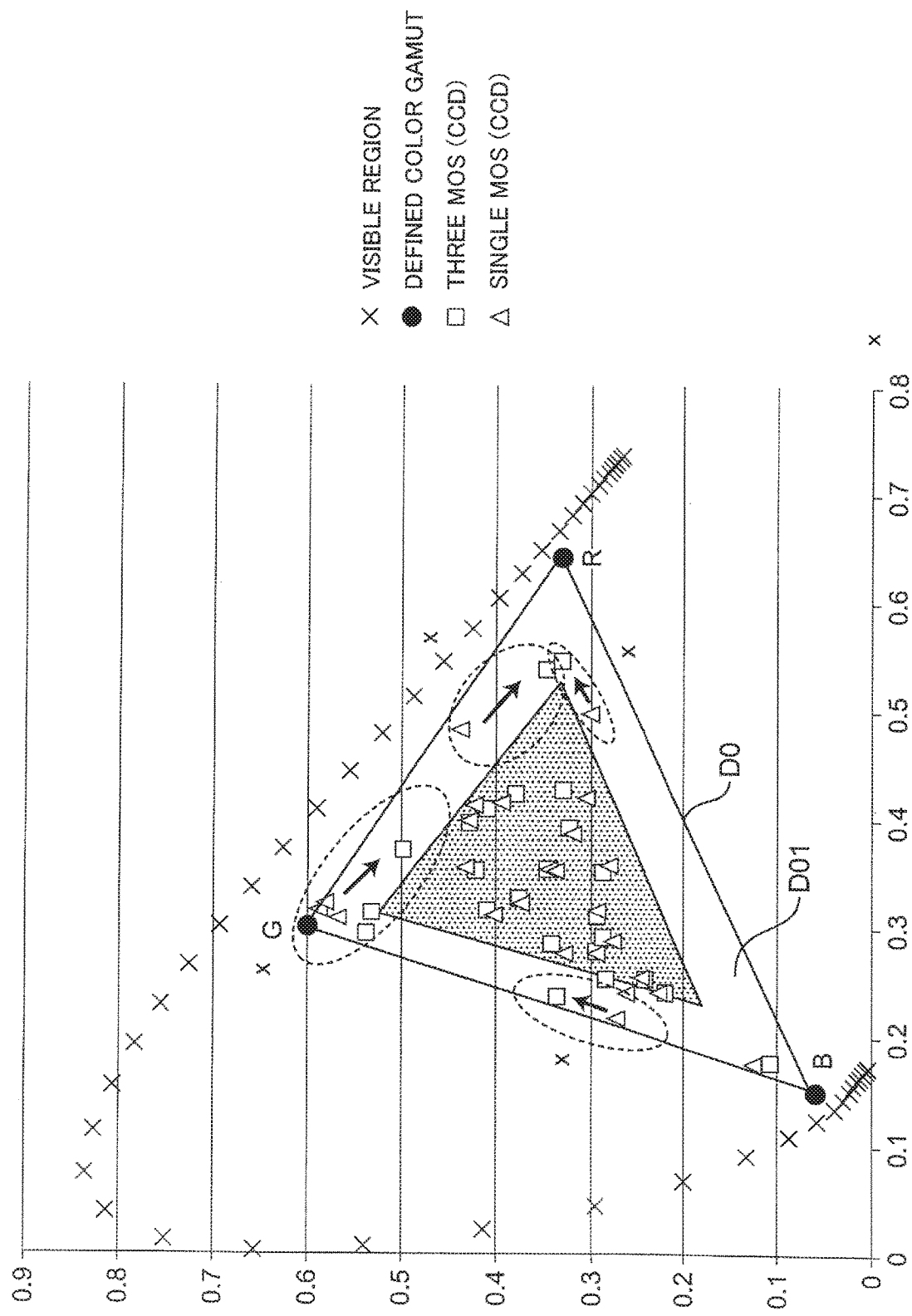

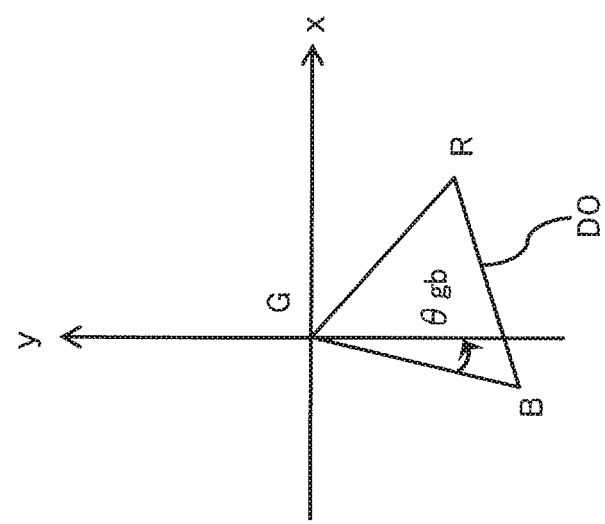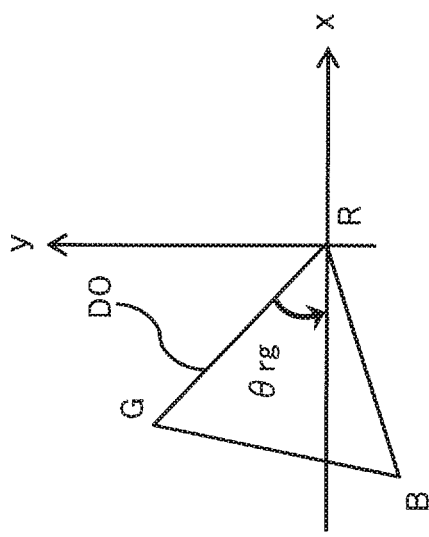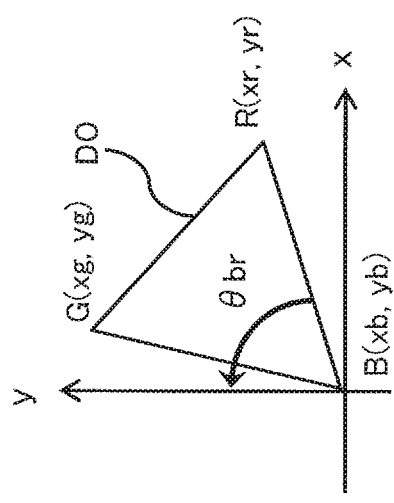

IMAGE PROCESSING DEVICE AND IMAGING APPARATUS

BACKGROUND

1. Technical Field

The present disclosure relates to an image processing device that converts the color of each pixel of an image and achieves desired color reproducibility. In addition, the present disclosure relates to an imaging apparatus including such an image processing device.

2. Related Art

Regarding saturation of an input signal of an image, JP 2012-119968 A discloses an image processing device including a color conversion means for converting the input signal of the image into a plurality of signals in the form of a uniform color space by using plural transformation matrices respectively corresponding to a plurality of predetermined saturation, a saturation calculation means for calculating saturation of any of the plurality of signals after the color conversion, a blend ratio determination means for determining a blend ratio based on the saturation calculated by the saturation calculation means, and a signal blend means for blending the plurality of signals color-converted by the color conversion means with the blend ratio determined by the blend ratio determination means. According to this image processing device, it is possible to perform color conversion processing with coloring an achromatic color image and controlling deterioration of color conversion accuracy of a chromatic color image.

SUMMARY

The present disclosure provides an image processing device and an imaging apparatus that achieve desired color reproducibility.

An image processing device according to a first aspect of the present disclosure includes: a first color conversion processor configured to perform first color conversion processing on image data; a second color conversion processor configured to perform second color conversion processing on the image data; a coefficient calculator configured to calculate a coefficient indicating a blend ratio between an output of the first color conversion processor and an output of the second color conversion processor; and a blend processor configured to blend the output of the first color conversion processor and the output of the second color conversion processor based on a ratio indicated by the coefficient. The coefficient calculator calculates a position on an xy chromaticity diagram of a color indicated by each pixel in image data processed by the first color conversion processor to determine the coefficient based on a distance from the calculated position to a boundary of a color gamut.

An imaging apparatus according to a second aspect of the present disclosure includes: an imaging device configured to receive a component of each color of RGB to generate image data; and the image processing device configured to receive the image data to perform color conversion processing.

According to the image processing device of the present disclosure, appropriate color conversion processing is performed based on the distance from the position on the xy chromaticity diagram of the pixel color to the boundary of the color gamut. Therefore, appropriately setting the color conversion processing allows desired color reproducibility to be achieved.

BRIEF DESCRIPTION OF DRAWINGS

FIG. 4B is a diagram illustrating parallel movement of colors along the color gamut boundaries (sides BR, RG, and GB) by color conversion processing.

FIGS. 6A, 6B and 6C are diagrams illustrating rotation around each vertex of the color gamut (triangular region).

DETAILED DESCRIPTION OF EMBODIMENTS

In the following, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art. It should be noted that the accompanying drawings and the following description are provided for a person skilled in the art to fully understand the present disclosure. Thus, the drawings and the description are not intended to limit the subject matter defined in the claims.

In the following, an embodiment of an imaging apparatus according to the present disclosure will be described with reference to the drawings.

First Embodiment

[1. Configuration]

Figure 1:
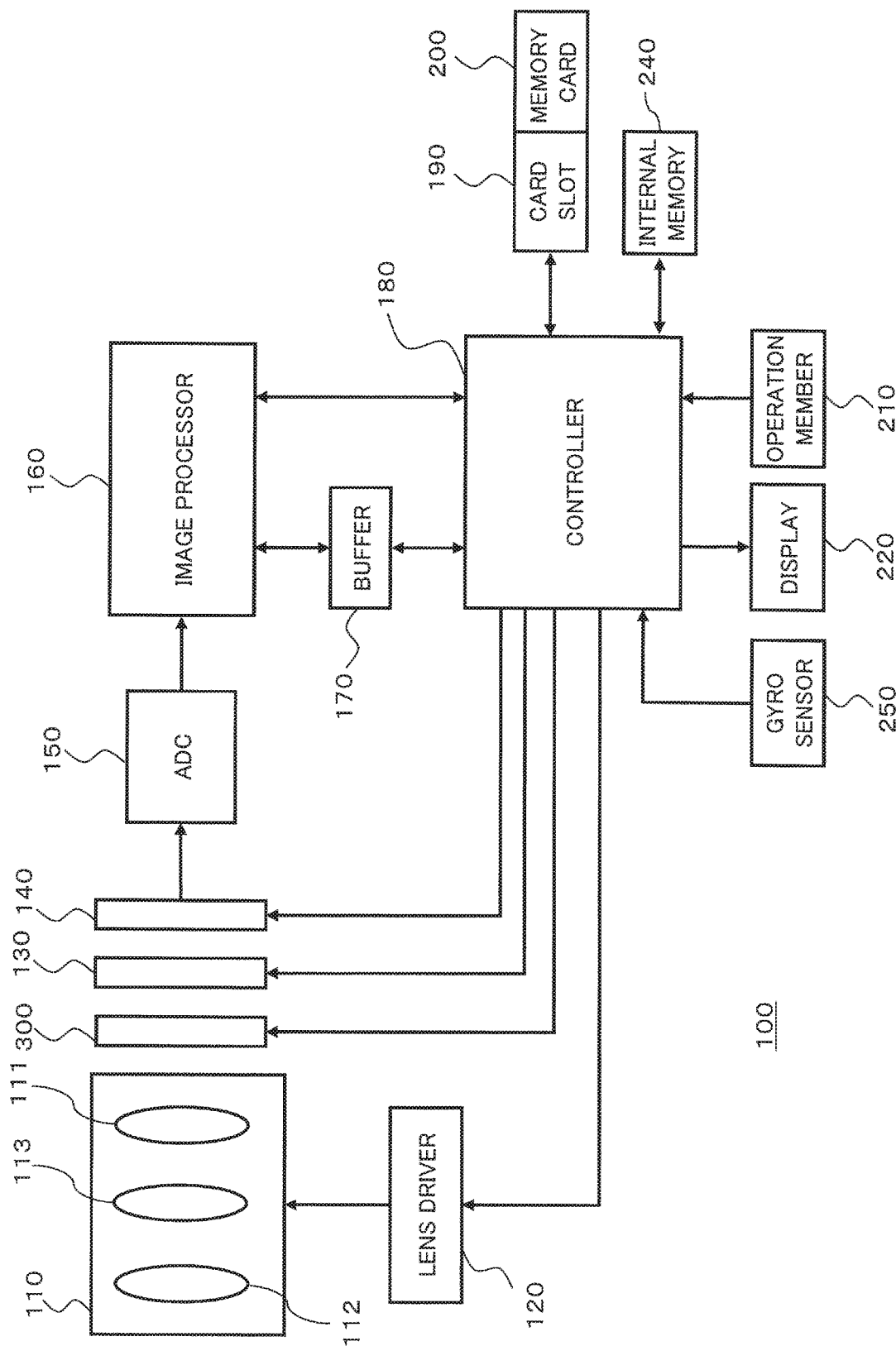
FIG. 1 is a diagram showing a configuration of a digital camera according to the present disclosure.

An electrical configuration of a digital camera (an example of an imaging apparatus) according to a first embodiment will be described with reference to FIG. 1. FIG. 1 is a block diagram showing the configuration of a digital camera 100. The digital camera 100 is an imaging apparatus for capturing a subject image formed by an optical system 110 including one or more lenses with an imaging device 140. The image data generated by the imaging device 140 is subjected to various processing by an image processor 160 and stored in a memory card 200. The digital camera 100 of the present embodiment is a single-MOS (CCD) camera, and includes only one imaging device 140. In the following, the configuration of the digital camera 100 will be described in detail.

The optical system 110 includes a focus lens 111 and a zoom lens 112. Moving the zoom lens 112 along the optical axis allows the subject image to be enlarged or reduced. Moving the focus lens 111 along the optical axis allows the focus (in-focus state) of the subject image to be adjusted. In addition, the optical system 110 includes a camera shake correction lens 113 for correcting image blurring caused by the shake of the digital camera 100.

The lens driver 120 drives various lenses included in the optical system 110. The lens driver 120 includes, for example, a zoom motor for driving the zoom lens 112 and a focus motor for driving the focus lens 111.

The diaphragm 300 adjusts the size of an opening according to the user's setting or automatically and adjusts the amount of light passing through the opening.

A shutter 130 is a means for shielding light to be incident on the imaging device 140. The shutter 130, together with the optical system 110 and the diaphragm 300, controls optical information indicating a subject image. The optical system 110 and the diaphragm 300 are stored in a lens barrel (not shown).

The imaging device 140 is an image sensor for converting an optical signal collected by the optical system 110 into an electrical signal to generate an analog image signal. The imaging device 140 is, for example, a CCD or CMOS image sensor.

An analog-to-digital converter (A/D converter, ADC) 150 converts the analog image signal generated by the imaging device 140 into a digital signal, that is, digital image data.

The image processor 160 (an example of the image processing device) performs various processing on digital image data generated by the imaging device 140 under control of a controller 180. The image processor 160 generates image data to be displayed on a display monitor 220 and generates image data for storage in the memory card 200. For example, the image processor 160 performs various processing such as gamma correction, white balance correction, flaw correction, and color conversion processing on the image data generated by the imaging device 140. In addition, the image processor 160 may compress the image data generated by the imaging device 140 if necessary with a compression format conforming to H.264 standard or MPEG-2 standard, or the like. The image processor 160 is implemented by, for example, semiconductor elements (electronic circuit). The image processor 160 may also be configured with only hardware (electronic circuit), or may be implemented by combining hardware and software.

The controller 180 is a control means for controlling the entire digital camera 100. The controller 180 may be configured with only hardware (electronic circuit), or may be implemented by combining hardware and software. The image processor 160 and the controller 180 can be implemented by a microcomputer, a CPU, an MPU, a digital signal processor (DSP), an ASIC, an FPGA or the like. The image processor 160 and the controller 180 may be integrally formed as one element.

A buffer 170 functions as a work memory of the image processor 160 and the controller 180. The buffer 170 can be implemented by, for example, a dynamic random access memory (DRAM), a ferroelectric memory, or the like.

A card slot 190 is a means for attaching the memory card 200 to the digital camera 100. The card slot 190 is capable of mechanically and electrically connecting the memory card 200 and the digital camera 100.

The memory card 200 includes a flash memory, a ferroelectric memory, or the like internally. The memory card 200 is capable of storing data such as image files generated by the image processor 160.

An internal memory 240 includes a flash memory, a ferroelectric memory, or the like. The internal memory 240 stores control programs, data, and the like for controlling the entire digital camera 100.

An operation member 210 is a collective term for user interfaces that receive operations from the user. The operation member 210 includes a button, a lever, a dial, a touch panel, a switch, and the like that receive operations from the user.

The display monitor 220 can display images indicated by the image data generated by the imaging device 140 (through images) and images indicated by the image data read from the memory card 200. In addition, the display monitor 220 can also display various menu screens and the like for performing various settings of the digital camera 100. The display monitor 220 includes a liquid crystal display device and an organic EL display device.

A gyro sensor 250 is a sensor that detects shake (movement) of the digital camera 100. Based on an output signal from the gyro sensor 250, the camera shake correction operation and the stillness determination are performed.

Figure 2:
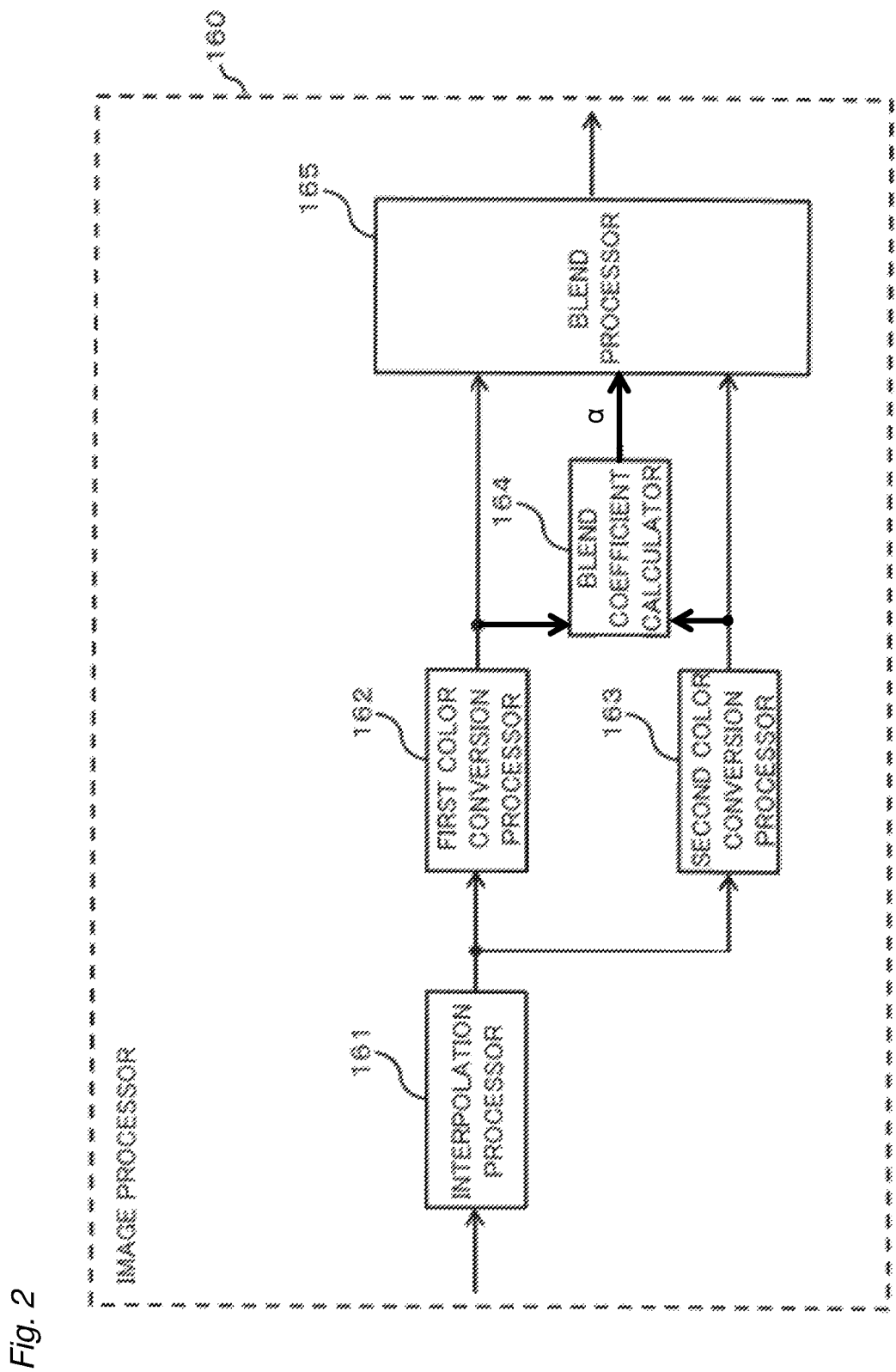
FIG. 2 is a diagram showing a configuration of an image processor.

FIG. 2 is a diagram illustrating a configuration relating to color conversion processing in the configuration of the image processor 160. As a configuration relating to color conversion processing, the image processor 160 includes an interpolation processor 161, a first color conversion processor 162, a second color conversion processor 163, a blend coefficient calculator 164, and a blend processor 165.

The interpolation processor 161 generates image data in which each pixel has information on each color of R, G, and B based on image data in which each pixel has information on only one color among RGB, by calculating out missing color information for each pixel with interpolation from information for surrounding pixels.

The first color conversion processor 162 performs first color conversion processing on the color of the region of the broad spectral light. The second color conversion processor 163 performs second color conversion processing different from the first color conversion processing on the color of the region of the narrow spectral light.

The blend coefficient calculator 164 calculates the position on the xy chromaticity diagram of the color of each pixel with respect to each pixel of the image. The blend processor 165 refers to the position input from the blend coefficient calculator 164 and blends outputs from the respective first and second color conversion processors 162 and 163.

[2. Operation]

The operation of the color conversion processing in the digital camera 100 having the above configuration will be described.

Before the operation of the color conversion processing in the digital camera 100 is described, the problems to be solved in the present embodiment will be described.

Figure 3:
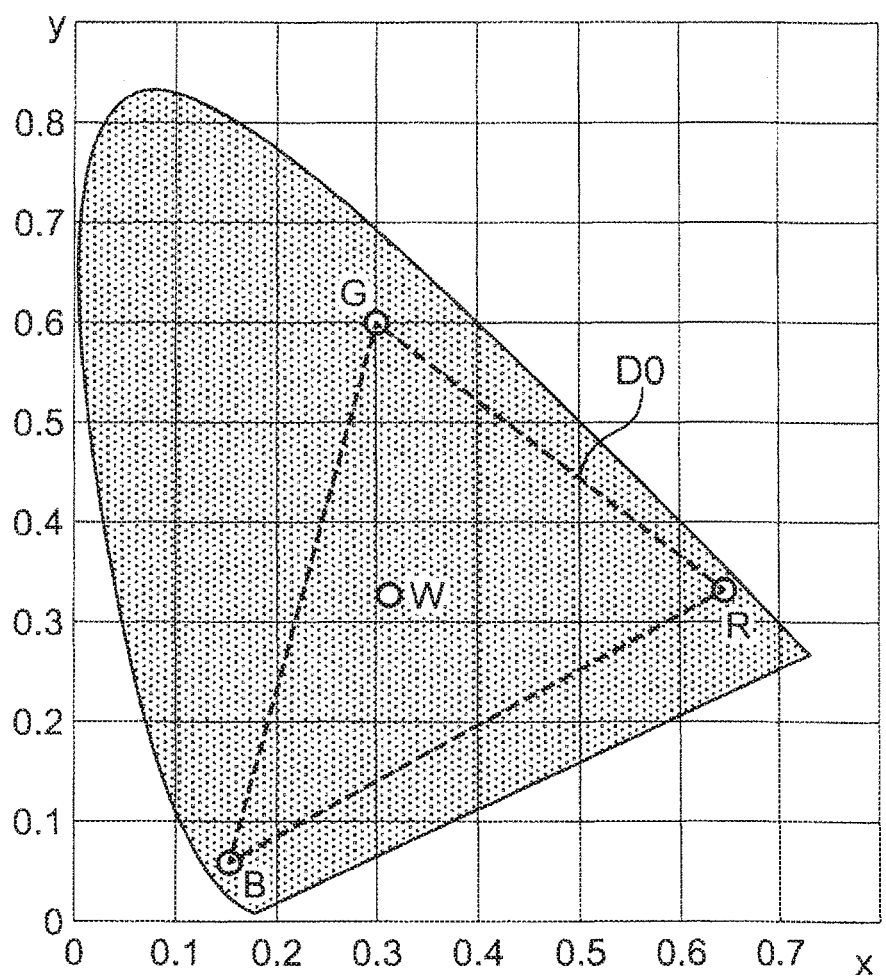
FIG. 3 is a diagram showing an xy chromaticity diagram.

FIG. 3 is a diagram showing the xy chromaticity diagram. In FIG. 3, a triangle region D0 indicated by a broken line is a color gamut (or shortly, gamut) formed with each of the three primary colors (R, G, B) as its vertex, and is defined in accordance with the BT.709 standard, for example. In such an xy chromaticity diagram, the saturation of the color becomes higher toward the outer side from the center W corresponding to the white point defined by the kind of the color gamut. Within the color gamut D0, the color of the region of the central part is a color of a relatively broad spectrum, and the color of the region in the vicinity of the boundaries (that is, sides BR, RG, and GB) is a color of a relatively narrow spectrum.

Generally in a digital camera, there are a three-MOS (CCD) camera of the type in which an imaging device is provided for each light of RGB colors, and a single-MOS (CCD) camera which receives all lights of RGB colors with one imaging device. The three-MOS (CCD) camera can obtain information on the entire RGB directly from optical information in each pixel of the imaging device. On the other hand, the single-MOS (CCD) camera can obtain only information on any one color of RGB directly from optical information in each pixel. Information on the other two colors which cannot be obtained from each pixel is obtained by interpolating information from surrounding pixels.

For this reason, color conversion processing may be performed so as to bring image data generated by the single-MOS (CCD) camera closer to the color characteristics of image data generated by the three-MOS (CCD) camera. For example, color conversion processing by linear matrix processing using the following determinant is performed. Here, (Rin, Gin, Bin) is the value of each pixel of the image data generated by the single-MOS (CCD) camera, and (Rout, Gout, Bout) is the value after the color conversion processing.

[Math. 1]

$$\begin{pmatrix} R_{out} \\ G_{out} \\ B_{out} \end{pmatrix} = \begin{pmatrix} 0.8484 & 0.214 & -0.0624 \\ 0.1239 & 0.9315 & -0.0554 \\ 0.0565 & -0.611 & 1.5545 \end{pmatrix} \begin{pmatrix} R_{in} \\ G_{in} \\ B_{in} \end{pmatrix} \quad (1)$$

Figure 4A:
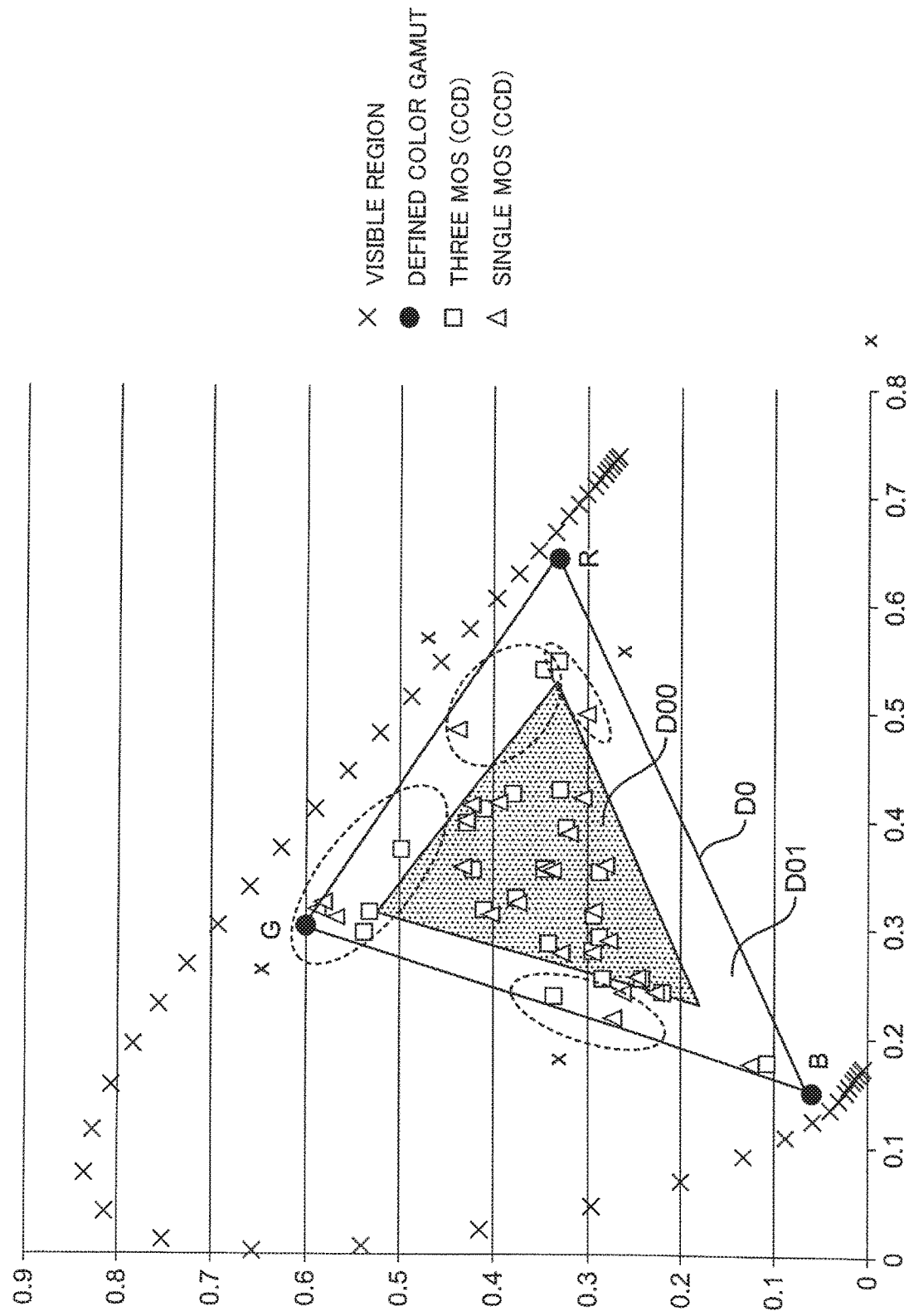
FIG. 4A is a diagram plotting colors in images captured by each of a single-MOS (CCD) camera and a three-MOS (CCD) camera on an xy chromaticity diagram.

FIG. 4A is a diagram plotting colors in the images captured by each of the single-MOS (CCD) camera and the three-MOS (CCD) camera on an xy chromaticity diagram. As in FIG. 4A, in the color gamut D0, the inner region D00 is a region of a color obtained by photographing the Macbeth chart, and the outer region D01 is a region of a color obtained by photographing LED light. The region D00 is a region of a color of light having a relatively broad spectrum (for example, a color when a printed matter or a coated object is photographed). The region D01 is a region of a color of light having a relatively narrow spectrum such as LED light.

As shown in FIG. 4A, in the region D00 close to the center of the xy chromaticity diagram, the color of the image captured by the single-MOS (CCD) camera (triangle plot) and the color of the image captured by the three-MOS (CCD) camera (quadrangle plot) are arranged at substantially the same position. That is, the difference in color of images is small between the single-MOS (CCD) camera and the three-MOS (CCD) camera. On the other hand, in the region D01 close to the end of the color gamut D0, there is a large deviation in the plot positions of the color of the image of the single-MOS (CCD) camera and the color of the image of the three-MOS (CCD) camera. In other words, the image captured by the single-MOS (CCD) camera and the image captured by the three-MOS (CCD) camera have different color characteristics, and in particular, the difference increases in the region at the end of the color gamut D0 (near the boundary).

Thus, proper color characteristics could not be obtained simply by color conversion processing using linear matrix processing.

In order to solve this problem, the inventors of the present application have focused attention on the fact that, in particular, the color of the narrow spectral light positioned at the peripheral portion of the color gamut D0 has the noticeable difference in color characteristic between the image of the three-MOS (CCD) camera and the image of the single-MOS (CCD) camera. From this viewpoint, the inventors found that a color reproduction processing, including discriminating whether the color to be processed is the color of the broad spectral light or the color of the narrow spectral light and performing different color reproduction processing according to each color, allows suitable reproduction processing that corresponds to the region of the color to be achieved. The inventors have devised that in particular, as shown in FIG. 4B, performing color conversion processing to move the hue substantially parallel along the boundaries of the color gamut D0 (sides BR, RG, and GB) on the color of the narrow spectral light (the color of the peripheral region D01 of the color gamut D0) so as to bring the color captured by the single-MOS (CCD) camera closer to the color captured by the three-MOS (CCD) camera allows favorable color reproduction processing to be achieved on the color of the narrow spectral light.

In the following, this embodiment discloses a device for converting the color characteristics of the image captured by the single-MOS (CCD) camera into the color characteristics of the image captured by the three-MOS (CCD) camera.

[2-1. Color Reproduction Processing]

Color reproduction processing by the image processor 160 in the digital camera 100 will be described.

Figure 5:
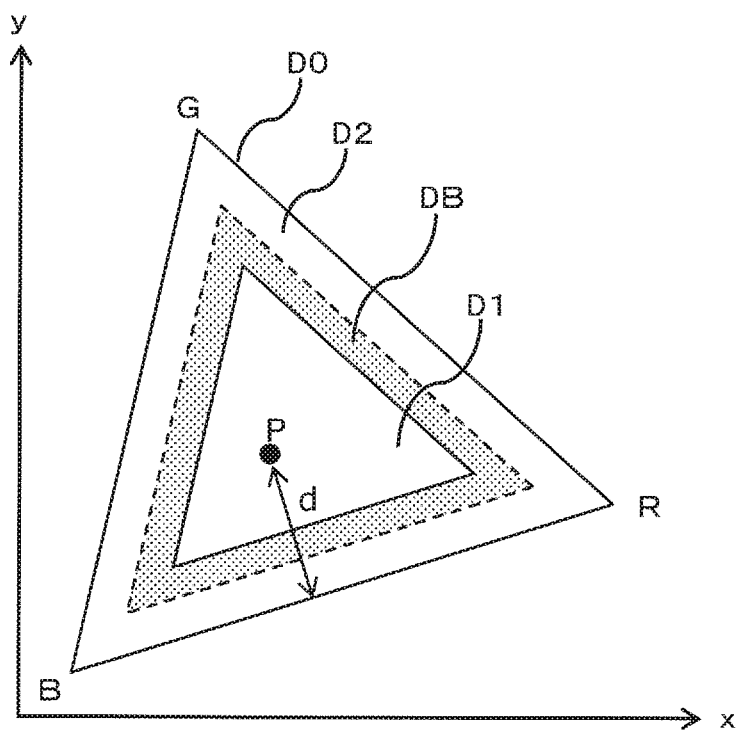
FIG. 5 is a diagram illustrating a first region, a second region, and a blend region in a color gamut of an xy chromaticity diagram.

As shown in FIG. 5, the image processor 160 manages the color gamut D0 of the xy chromaticity diagram by dividing it into three regions, that is, a first region D1, a second region D2, and a blend region DB. The first region D1 is a region provided innermost in the color gamut D0. The second region D2 is a region provided outermost in the color gamut D0. The blend region DB is a region set between the first region D1 and the second region D2.

When the color after first conversion processing is within the first region D1, first color conversion processing is performed on that color. When the color after the first conversion processing is within the second region D2, second color conversion processing is performed on that color. When the color after the first conversion processing is within the blend region DB, both the first color conversion processing and the second color conversion processing are performed on that color. Each of the size of the first region D1 and the blend region DB (that is, boundary) is appropriately set according to the color characteristics of a desired image.

The image processor 160 performs the first color conversion processing and the second color conversion processing on the input image data. Then, for each pixel, the image processor 160 blends the result of the first color conversion processing and the result of the second color conversion processing as shown in the following formula (2) with the ratio of the coefficient α (0≤α≤1), to determine the pixel value after the color reproduction processing.

[Math. 2]

$$\begin{pmatrix} R_o \\ G_o \\ B_o \end{pmatrix} = \alpha \begin{pmatrix} R_c \\ G_c \\ B_c \end{pmatrix} + (1-\alpha) \begin{pmatrix} R_e \\ G_e \\ B_e \end{pmatrix} \qquad (2)$$

In the equation (2), (Rc, Gc, Bc) is a pixel value of the pixel after the first color conversion processing. (Re, Ge, Be) is a pixel value of the pixel after the second color conversion processing. (Ro, Go, Bo) is a pixel value after the color reproduction processing. The coefficient α is a coefficient that determines the ratio of the blend. The coefficient α is set according to the distance from the coordinates of the color to be converted to the end of the boundaries of the color gamut D0 in the xy chromaticity diagram.

In the following, the color reproduction processing of the image processor 160 will be described more specifically.

The image processor 160 inputs the image data generated by the imaging device 140 to perform predetermined image processing on the input image data. Since the digital camera 100 of the present embodiment is a single-MOS (CCD) camera, each pixel of the image data generated by the imaging device 140 has information on one color among RGB. The interpolation processor 161 obtains colors on which there is no information in each pixel of the above image data by interpolation from information for surrounding pixels. Thus, image data in which each pixel has information on each color of R, G and B is generated. The image processor 160 performs color reproduction processing on the image data in which each pixel has information on each color of R, G, and B.

In the image processor 160, the first color conversion processor 162 performs first color conversion processing on each pixel of the image data. Here, the first color conversion processing is color reproduction processing on the color of broad spectral light, and for example, linear matrix processing. The color of broad spectral light is a color of a region close to the center of the color gamut D0. For example, such a color causes when a printed matter or a painted object is photographed. Alternatively, the first color conversion processing may be color conversion processing using a look-up table.

The second color conversion processor 163 performs second color conversion processing on each pixel of the image data. Here, the second color conversion processing is color reproduction processing on the color of narrow spectral light, and for example, a 6-axis color correction processing or a 12-axis color correction processing. The color of narrow spectral light is a color of a region close to the periphery of the color gamut D0. For example, such a color causes by laser light or LED light. Details of 12-axis color correction processing will be described below. Alternatively, the second color conversion processing may be color conversion processing using a look-up table.

Based on the output of the first color conversion processor 162, the blend coefficient calculator 164 determines a coefficient α indicating a blending ratio for each pixel. Specifically, first, the blend coefficient calculator 164 determines the coordinates on the xy chromaticity diagram of the color of the pixel after the first color conversion processing. For example, as shown in FIG. 5, a coordinate P on the xy chromaticity diagram of the pixel is determined.

Then, the blend coefficient calculator 164 determines the distance from the pixel color coordinate P to each side of BR, RG, and GB of the color gamut D0 in the xy chromaticity diagram.

In order to determine the distance to each side of BR, RG, and GB, the blend coefficient calculator 164 uses coordinate systems obtained by rotating the xy chromaticity diagram around each vertex R, G, and B of the color gamut D0. That is, when the distance from the color coordinate P of a certain pixel to the side BR of the color gamut D0 is determined, as shown in FIG. 6A, a coordinate system rotated around the vertex B by an angle θbr is used. The angle θbr is set so that the side BR after rotation superposes on the y-axis.

The coordinate conversion formula when coordinates are rotated by an angle θ around the vertex B is expressed by the following equation, where the coordinates (x, y) are the coordinates of the color before rotation, and the coordinates (x', y') are the coordinates of the color after rotation. The coordinates (xb, yb) are the coordinates of the vertex B.

[Math. 3]

$$\begin{pmatrix} x' \\ y' \end{pmatrix} = \begin{pmatrix} \cos\theta & -\sin\theta \\ \sin\theta & \cos\theta \end{pmatrix} \begin{pmatrix} x - xb \\ y - yb \end{pmatrix} \qquad (3)$$

Similarly, when the distance from the color coordinate P of the pixel to the side RG of the color gamut D0 is determined, as shown in FIG. 6B, a coordinate system rotated around the vertex R by an angle θrg is used. The angle θrg is set so that the side RG after rotation superposes on the x-axis. Similarly, when the distance from the color coordinate P of the pixel to the side GB of the color gamut D0 is determined, as shown in FIG. 6C, a coordinate system rotated around the vertex G by an angle θgb is used. The angle θgb is set so that the side GB after rotation superposes on the y-axis.

Figure 7A:
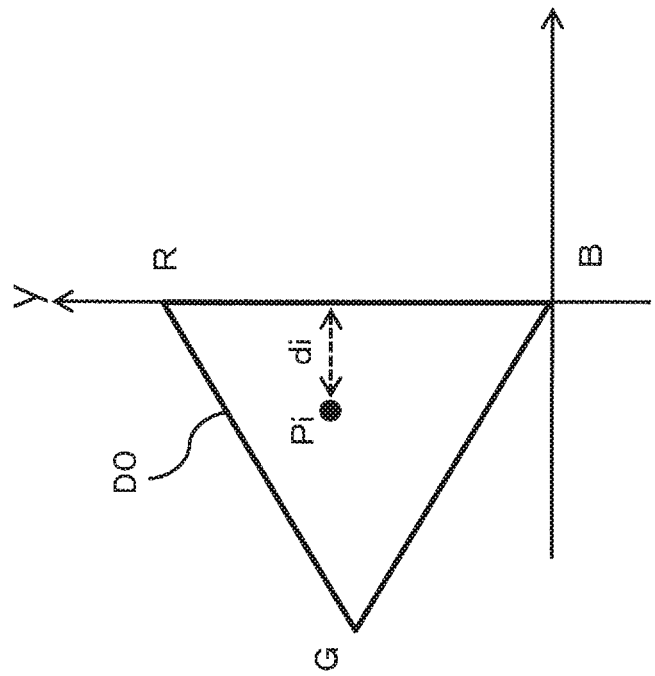
FIGS. 7A and 7B are diagrams illustrating rotation around the point B in the color gamut.
Figure 7B:
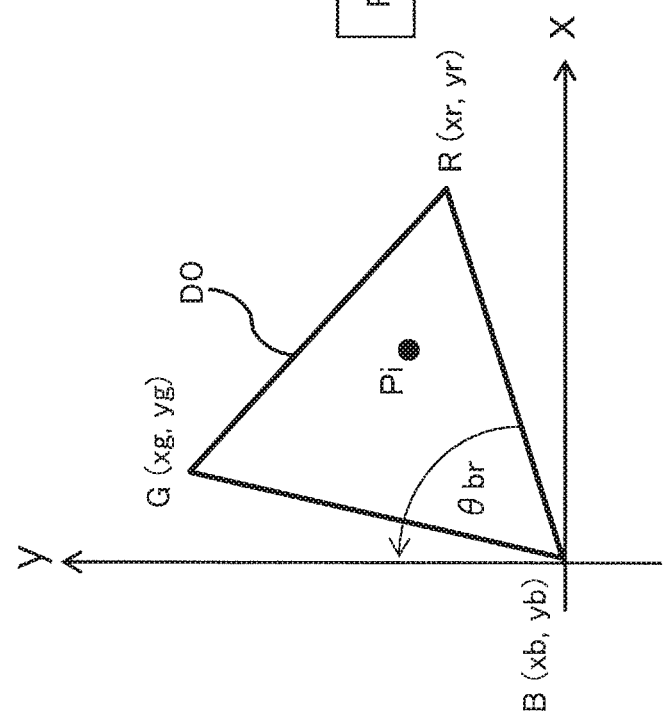

The blend coefficient calculator 164 determines the distance from each pixel to each side of the color gamut D0 in each of the coordinate systems rotated as described above. For example, in order to determine a distance di from the coordinate Pi of the pixel color to the side BR of the second region D2, first, the coordinate Pi of the pixel color is determined on the coordinate system obtained by rotating the coordinate system shown in FIG. 7A by the angle θbr around the vertex B (see FIG. 7B). Then, the distance di from the coordinate Pi to the side BR is determined by its x coordinate value. Similarly, the distance from the coordinate Pi to the side RG and the distance from the pixel Pi to the side GB are determined by using the rotating coordinate system.

After determining the distance to each side as described above, the blend coefficient calculator 164 determines the coefficient α by using the minimum value among the determined three distances. That is, the smallest distance of the three distances is defined as a distance d to the boundary of the color gamut D0 of that color. Then, based on this distance d, it is determined which region of the first region D1, the second region D2, and the blend region DB the color to be processed is in, and the coefficient α is determined based on the determination result.

Figure 8A:
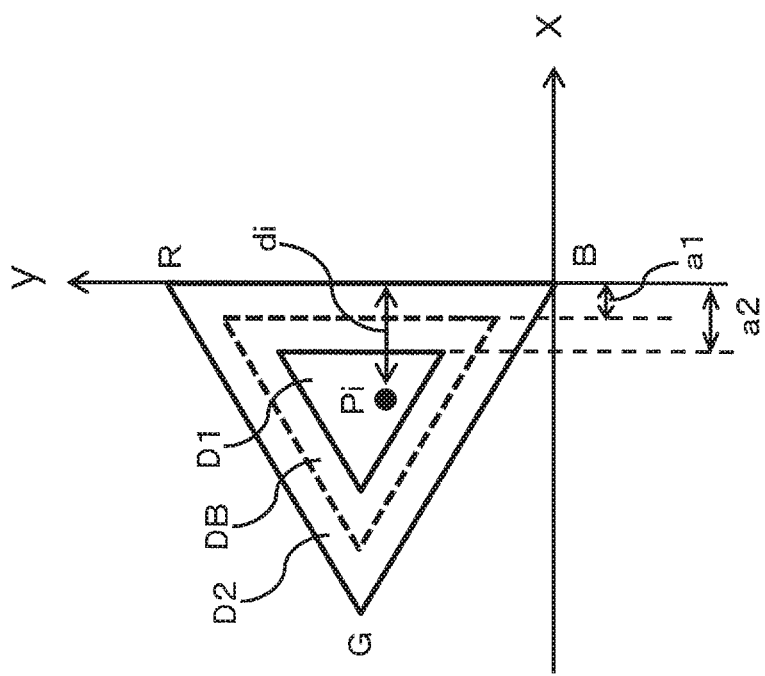
FIGS. 8A and 8B are diagrams illustrating a method for determining a coefficient α for blending.
Figure 8B:
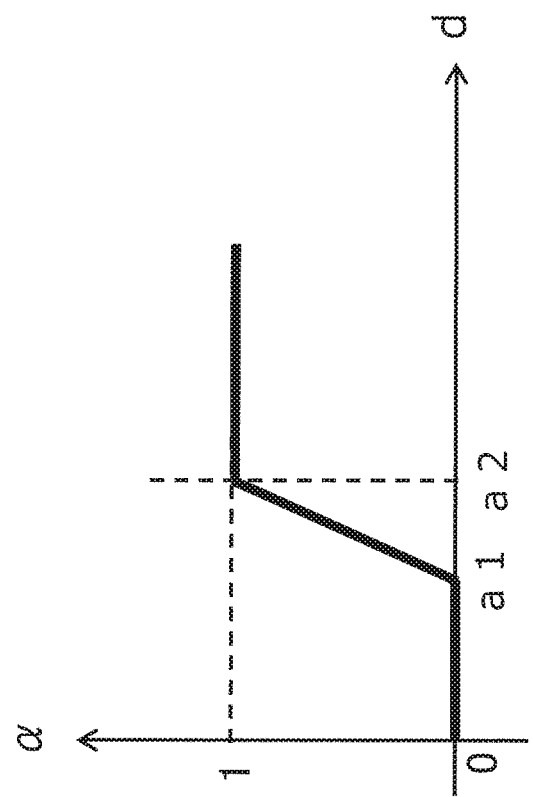

FIGS. 8A and 8B are diagrams for illustrating a method for determining the coefficient α. FIG. 8A is a diagram illustrating a threshold value for region determination. A first threshold value for determining whether or not the color is within the second region D2 is set to a distance (a1) from one side of the second region D2 (for example, side BR) to one side of the blend region DB opposed thereto. A second threshold value for determining whether or not the color is within the first region D1 is set to a distance (a2) from one side of the second region D2 to one side of the first region D1 opposed thereto.

FIG. 8B is a diagram showing the relationship between the distance d and the coefficient α. As shown in FIG. 88B, when the distance d is less than the first threshold value (a1), that is, when the color to be processed is in the second region D2, the coefficient α is set to zero. When the distance d is not less than the first threshold value (a1) but less than the second threshold value (a2), that is, when the color to be processed is in the blend region DB, the coefficient α is set to a value proportional to the distance d between 0 and 1. When the distance d is not less than the second threshold value (a2), that is, when the color to be processed is in the first region D1, the coefficient α is set to 1. It should be noted that in the present example, a linear function can be applied to the function of the coefficient α in the case where the distance d is not less than the first threshold value (a1) but less than the second threshold value (a2), however, the present disclosure is not limited to this. The function of the coefficient α at this case has only to be a function of monotonously increasing according to the distance with continuous connections to the function in the case where the distance d is less than the first threshold value (a1) and to the function in the case where the distance d is not less than the second threshold value (a2).

That is, when the color of the pixel after the first conversion processing is in the second region D2, the coefficient α is set to 0. Thus, according to the equation (2), the value after the conversion does not reflect the value after the first color conversion processing but is equal to the value after the second color conversion processing. That is, in this case, the color reproduction processing by only the second color conversion processing is performed.

When the color of the pixel after the first conversion processing is in the blend region DB, the coefficient α is set to a value between 0 and 1. In this case, according to the equation (2), the value after the conversion is a value obtained by blending the value after the first color conversion processing and the value after the second color conversion processing at a ratio corresponding to the coefficient α. That is, the color reproduction processing in which the first color conversion processing and the second color conversion processing are blended is performed.

When the color of the pixel after the first conversion processing is inside the first region D1, the coefficient α is set to 1. In this case, according to the equation (2), the value after the conversion does not reflect the value after the second color conversion processing but is equal to the value after the first color conversion processing. That is, the color reproduction processing by only the first color conversion processing is performed.

That is, when the coefficient α is large, the contribution degree of the output of the first color conversion processor 162 increases, and when the coefficient α is small, the contribution degree of the output of the second color conversion processor 163 increases. Thus, depending on whether the color to be converted is the color of the narrow spectral light or the color of the broad spectral light, it is possible to perform color conversion processing suitable for either the color of the narrow spectral light or the color of the broad spectral light.

For each pixel, the blend processor 165 blends the output of the first color conversion processor 162 and the output of the second color conversion processor 163 based on the equation (2) by using the coefficient α determined by the blend coefficient calculator 164 to calculate the value after color conversion.

As described above, the image processor 160 in the digital camera 100 of the present embodiment determines, based on the coordinates on the xy chromaticity diagram of the color subjected to the first color conversion processing, whether the color is a color of the broad spectral light or a color of the narrow spectral light, and causes the color conversion processing on the pixel to differ based on the determination result. Thus, appropriate color reproduction processing can be applied to each of the color of the broad spectral light and the color of the narrow spectral light. As a result, it is possible to achieve favorable color reproduction processing on both the color of the broad spectral light and the color of the narrow spectral light.

Here, 12-axis color correction being an example of the second color conversion processing will be described. In 12-axis color correction with one component (for example, G component) out of the three components of RGB smallest, changing the ratio of the remaining two components (for example, R and B components) makes a correction to shift the color along the outer periphery (each side) of the color gamut D0.

Figure 9:
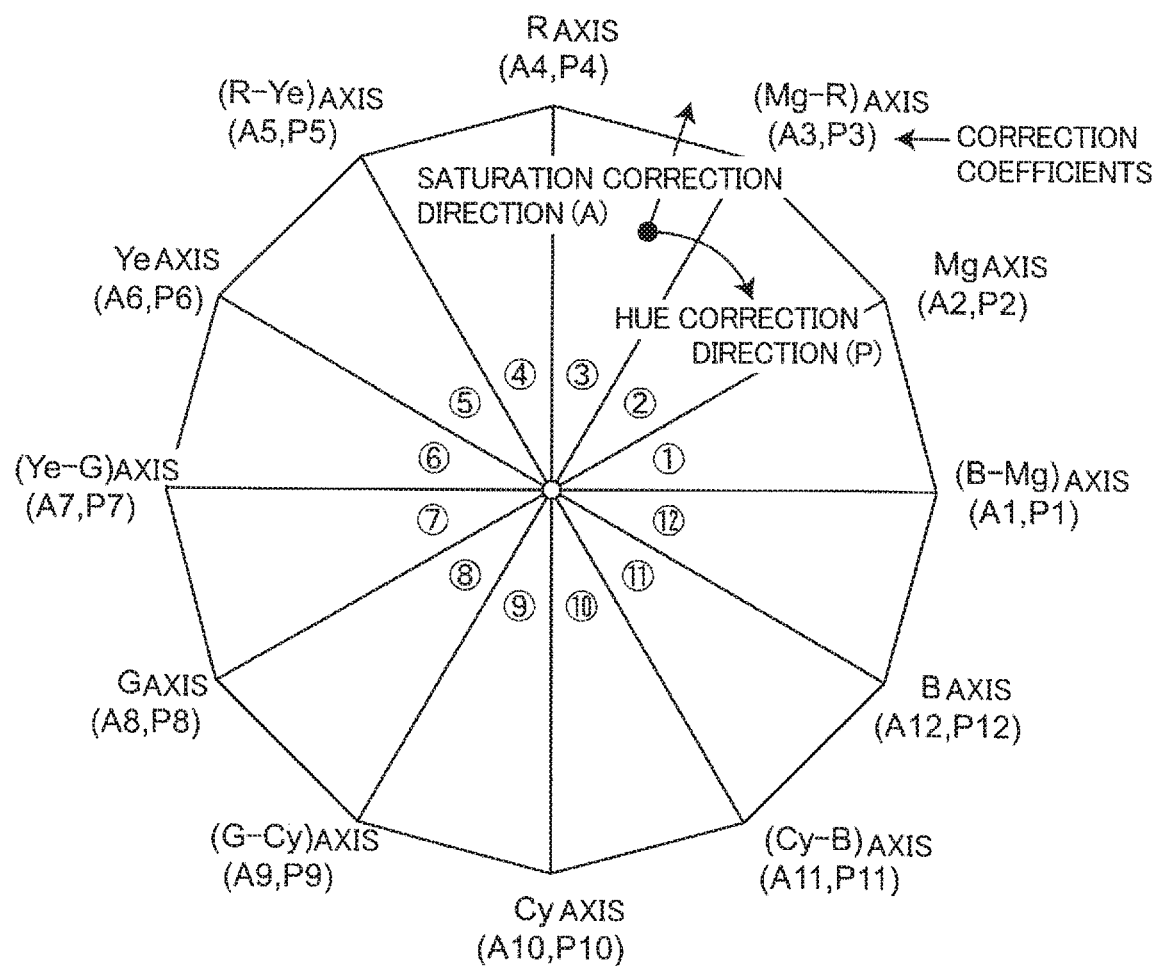
FIG. 9 is a diagram illustrating 12-axis color correction processing (second color conversion processing).
Figure 10:
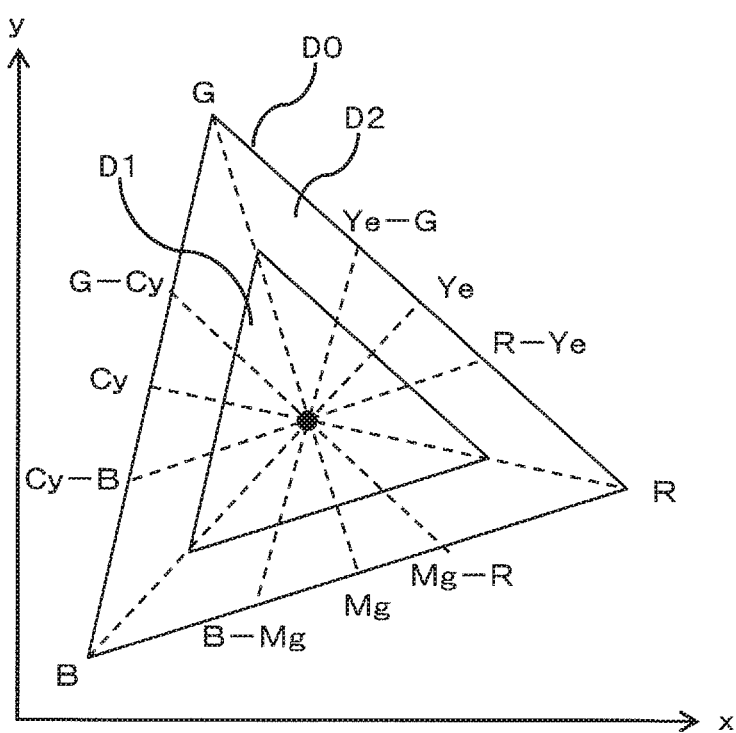
FIG. 10 is a diagram illustrating division of the region for 12-axis color correction in the color gamut.

FIG. 9 is a diagram illustrating the axes of a color defined in 12-axis color correction. In the 12-axis color correction, as shown in FIG. 9, a color space is equally divided by 30 degrees to prepare 12 correction axes. Then, the saturation (axial direction) and hue (direction perpendicular to the axis) of the color on each axis are independently adjusted. In FIG. 9, G, B, and R are three primary colors, Mg, Ye, and Cy are respectively corresponding complementary colors, and B-MG, Mg-R, R-Ye, Ye-G, G-Cy, and Cy-B are colors positioned exactly in the middle between these three primary colors and three complementary colors. On a color positioned except on these correction axes, correction is performed from each axis in the form of weighting according to the component ratios in the two correction-axis directions sandwiching this color. FIG. 10 is a diagram illustrating division of a region for 12-axis color correction in the color gamut D0.

A specific example of 12-axis color correction will be described with reference to FIG. 11. In the following, the case of correcting the color included in the region interposed between (Mg-R) axis and (B-Mg) axis in the vicinity of the Mg axis will be described as an example. In 12-axis color correction, each of saturation and hue is corrected. The color to be corrected in the vicinity of Mg axis is corrected differently according to the position. In the following, description will be made with the value of the color before correction as (R_In, G_In, B_In) and the value of the color after correction as (R_Out, G_Out, B_Out).

a) Correction of Saturation

Figure 11B:
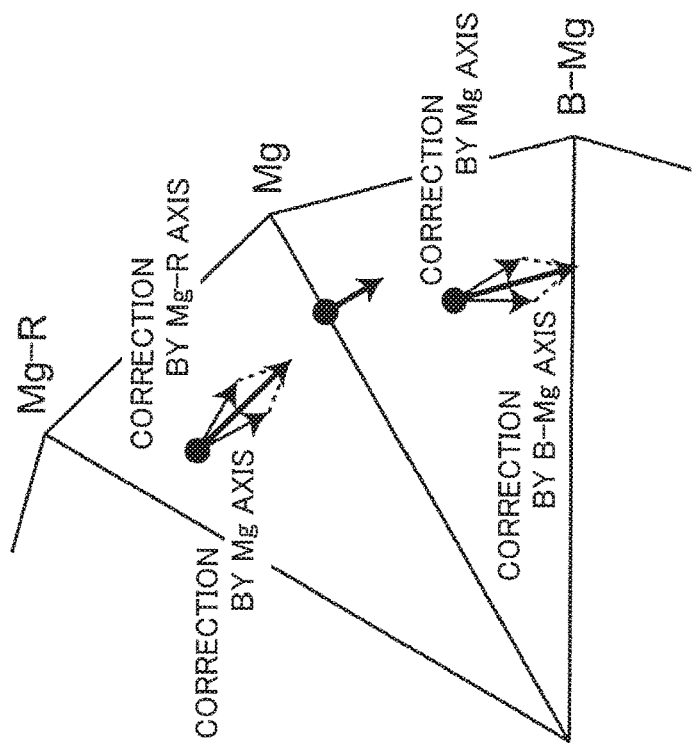
FIG. 11B is a diagram illustrating correction of hue in the 12-axis color correction.
Figure 11A:
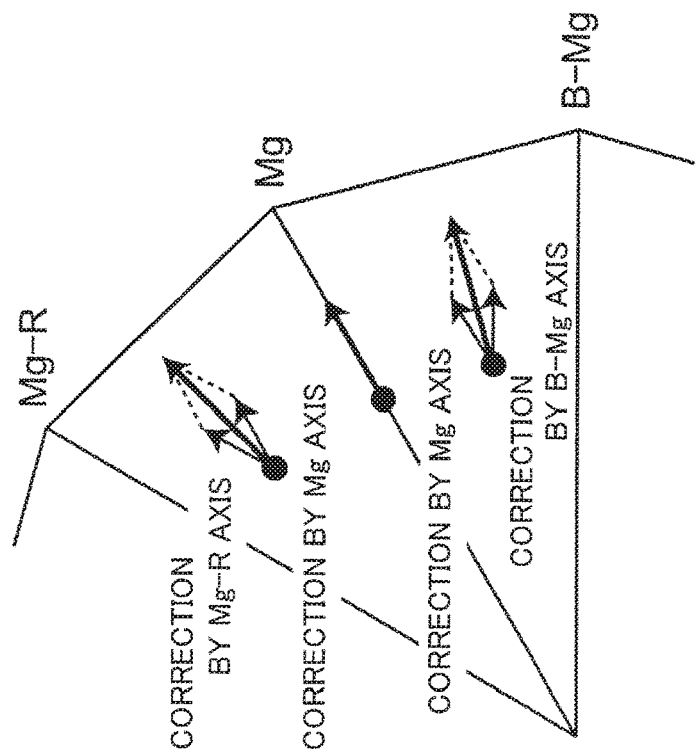
FIG. 11A is a diagram illustrating correction of saturation in the 12-axis color correction.

Correction of saturation will be described with reference to FIG. 11A. Let A1 be the correction coefficient on the B-Mg axis, let A2 be the correction coefficient on the Mg axis, and let A3 be the correction coefficient on the Mg-R axis.

When the color to be corrected is a color included in the region from the Mg axis to the B-Mg axis side, the color to be corrected is affected by both the correction of the Mg axis (A2) and the correction of the B-Mg axis (A1). That is, as shown in FIG. 11A, the saturation of the color to be corrected is shifted in the direction of the resultant correction vector of the Mg axis correction vector (A2) and the B-Mg axis correction vector (A1).

When the color to be corrected is a color on the Mg axis, correction of the Mg axis (A2) is performed.

When the color to be corrected is a color included in the region from the Mg axis to the Mg-R axis, the color to be corrected is affected by both the correction of the Mg axis (A2) and the correction of the Mg-R axis (A3). That is, as shown in FIG. 11A, the saturation of the color to be corrected is shifted in the direction of the resultant correction vector of the Mg axis correction vector (A2) and the Mg-R axis correction vector (A3).

For example, the values after saturation correction (R_Out, G_Out, B_Out) on colors on the Mg axis (R_In, G_In, B_In) can be obtained by the following equations:

$$G\_Out = G\_In$$

$$B\_Out = B\_In + (F \cdot A2)$$

$$R\_Out = R\_In + (F \cdot A2)$$

where F=2B−R−G. On the Mg axis, saturation is corrected by A2 times.

b) Correction of Hue

Hue correction will be described with reference to FIG. 11B. Let P1 be the hue correction coefficient on the B-Mg axis, let P2 be the hue correction coefficient on the Mg axis, and let P3 be the hue correction coefficient on the Mg-R axis.

When the color to be corrected is a color included in the region from the Mg axis to the B-Mg axis side, the color to be corrected is affected by both the correction of the Mg axis (P2) and the correction of the B-Mg axis (P1). That is, as shown in FIG. 11B, the hue of the color to be corrected is shifted in the direction of the resultant correction vector of the Mg axis correction vector (P2) and the B-Mg axis correction vector (P1).

When the color to be corrected is a color on the Mg axis, correction of the Mg axis (P2) is performed.

When the color to be corrected is a color included in the region from the Mg axis to the Mg-R axis, the color to be corrected is affected by both the correction of the Mg axis (P2) and the correction of the Mg-R axis (P3). That is, as shown in FIG. 11B, the hue of the color to be corrected is shifted in the direction of the resultant correction vector of the Mg axis correction vector (P2) and the Mg-R axis correction vector (P3).

For example, the values after hue correction (R_Out, G_Out, B_Out) on colors on the Mg axis (R_In, G_In, B_In) can be obtained by the following equations:

$$G\_Out = G\_In$$

$$B\_Out = B\_In + (F \cdot P2)$$

$$R\_Out = R\_In - (F \cdot P2)$$

where F is the same value in the saturation correction equations. When the correction coefficient P2 is positive, the hue moves in a direction from the Mg-R axis to the B-Mg axis. When the correction coefficient P2 is negative, the hue moves in a direction from the B-Mg axis to the Mg-R axis. Then, as with the saturation correction, correction of adjacent axes is also applied at the same time.

To summarize a) and b) above, the following relationship holds.

$$G\_Out = G\_In$$

$$B\_Out = B\_In + (F \cdot A2) + (F \cdot P2)$$

$$R\_Out = R\_In + (F \cdot A2) - (F \cdot P2)$$

As described above, the 12-axis color correction can shift the color along the hue direction, that is, the outer periphery of the color gamut. The above example is a case where one component out of the three components of RGB is smallest. In this case, changing the ratio of the remaining two components makes a correction to shift the color along the outer periphery (each side) of the color gamut D0.

[3. Effect and the Like]

As described above, the digital camera 100 (an example of an electronic apparatus to which the image processing device is applied) of the present embodiment includes: a first color conversion processor 162 configured to perform first color conversion processing on image data; a second color conversion processor 163 configured to perform second color conversion processing on the image data; a blend coefficient calculator 164 configured to calculate a coefficient α indicating a blend ratio between an output of the first color conversion processor 162 and an output of the second color conversion processor 163; and a blend processor 165 configured to blend the output of the first color conversion processor 162 and the output of the second color conversion processor 163 based on a ratio indicated by the coefficient α. The blend coefficient calculator 164 calculates a position on an xy chromaticity diagram of a color indicated by each pixel in image data processed by the first color conversion processor 162 to determine the coefficient α based on a distance d from the calculated position to a boundary of a color gamut D0.

With the above configuration, the distance d from the color position to the boundary of the color gamut D0 can determine whether or not the color is a color in the vicinity of the boundaries (three sides BR, RG, and GB) of the color gamut D0. That is, based on the distance d, it can be determined whether the color is a color of the broad spectral light or a color of the narrow spectral light, and based on the determination result, the coefficient α is determined so that the color conversion processing is made different. Thus, appropriate color reproduction can be achieved on each of the color of the broad spectral light and the color of the narrow spectral light.

The blend coefficient calculator 164 may determine the coefficient α so that a percentage at which an output after the second color conversion processing is blended increases as a value of the distance d decreases.

For example, as shown in FIG. 8B, the blend coefficient calculator 164 may determine the coefficient α so that in the case where a value of the distance d is less than a first threshold value (a1), a percentage of an output after the second color conversion processing reaches 100%, in the case where a value of the distance is not less than a second threshold value (a2) that is larger than a first threshold value (a1), a percentage of an output after the first color conversion processing reaches 100%, and in the case where a value of the distance d is not less than a first threshold value (a1) but less than a second threshold value (a2), an output after the first color conversion processing and an output after the second color conversion processing are blended according to the distance.

Color information on the image data includes three components (for example, RGB), and when a value of a smallest component out of the three components of the image data is smaller than a predetermined value, the second color conversion processor 163 may change a ratio of remaining two components, causing hue to move approximately parallel to one side of the color gamut in the xy chromaticity diagram. For example, in the case of expressing the values of the three components by 8 bit gradation (0 to 255), the predetermined value is set to, for example, 32, 16 or 10.

The first color conversion processing is processing suitable for color reproduction of color of light having a relatively broad spectrum, and the second color conversion processing may be set to processing suitable for color reproduction of color of light having a relatively narrow spectrum.

Other Embodiments

As described above, the first embodiment is described as an example of the technique disclosed in the present application. However, the technique in the present disclosure is not limited to this, and can also be applied to embodiments in which changes, substitutions, additions, omissions, and the like are made as appropriate. In addition, it is also possible to combine each component described in the first embodiment to form a new embodiment. Thus, in the following, other embodiments will be exemplified.

In the above embodiment, the first and second color conversion processing are set so that the color characteristic of the image data captured by the single-MOS (CCD) camera is brought close to the color characteristic of the image data captured by the three-MOS (CCD) camera. The first color conversion processing and the second color conversion processing are not limited to the above processing. Each of the first and second color conversion processing can be appropriately set according to desired color reproducibility.

In the above embodiment, 12-axis color correction is described as an example of the second color conversion processing. The second color conversion processing is not limited to this. As the second color conversion processing, three-axis color correction, six-axis color correction, 15-axis color correction, and 24-axis color correction may be used and n-axis color correction (n is an integer of 3 or more) can be used.

In the above embodiment, the description is made by using a digital camera as an example of an electronic apparatus including an image processing device, but the electronic apparatus to which the image processing device is applied is not limited thereto. That is, the idea of the image processing device of the present disclosure can be applied to various electronic apparatuses that process image data. The idea of the image processing device of the present disclosure can be applied to, for example, imaging apparatuses such as a digital video camera, a smartphone, and a wearable camera, image display devices such as a display or a television, a reading device such as a scanner, and also to an information processing apparatus such as a personal computer.

As described above, the embodiments are described as the exemplification of the technique in the present disclosure. For that, the accompanying drawings and the detailed description are provided. Therefore, among the components described in the accompanying drawings and the detailed description, not only the components essential for solving the problem, but also the components not essential for solving the problem may be included in order to exemplify the above technique. Therefore, it should not be recognized that these non-essential components are essential immediately because these non-essential components are described in the accompanying drawings and the detailed description. In addition, since the above embodiments are for illustrating the technique in the present disclosure, various changes, substitutions, additions, omissions, and the like can be made within the scope of the claims or the equivalent thereof.

The present disclosure can be applied to an image processing device that performs color conversion processing of image data, and furthermore, can be widely applied to various electronic apparatuses that process image data (for example, an imaging apparatus and an image display device).

The invention claimed is:

1. An image processing device comprising:
a first color conversion processor configured to perform first color conversion processing on image data;
a second color conversion processor configured to perform second color conversion processing on the image data;
a coefficient calculator configured to calculate a coefficient indicating a blend ratio between an output of the first color conversion processor and an output of the second color conversion processor; and
a blend processor configured to blend the output of the first color conversion processor and the output of the second color conversion processor based on the ratio indicated by the coefficient,
wherein the coefficient calculator calculates a position on an xy chromaticity diagram of a color indicated by each pixel in image data processed by the first color conversion processor to determine the coefficient based on a distance from the calculated position to a boundary of a color gamut;
wherein the coefficient calculator determines the coefficient so that a percentage at which an output after the second color conversion processing is blended increases as a value of the distance decreases; and
wherein the coefficient calculator determines the coefficient so that
when the value of the distance is less than a first threshold value, a percentage of the output after the second color conversion processing reaches 100%,
when the value of the distance is not less than a second threshold value that is large than the first threshold value, a percentage of an output after the first color conversion processing reaches 100%, and
when the value of the distance is not less than the first threshold value but less than the second threshold value, the output after the first color conversion processing and the output after the second color conversion processing are blended according to the distance.

2. The image processing device according to claim 1, wherein color information on the image data includes three components, and
wherein when a value of a smallest component in the three components of the image data is smaller than a predetermined value, the second color conversion processor changes a ratio of remaining two components, causing hue to move substantially parallel to one side of the color gamut in the xy chromaticity diagram.

3. The image processing device according to claim 1, wherein the first color conversion processing is processing suitable for color reproduction of color of light having a relatively broad spectrum, and the second color conversion processing is set to processing suitable for color reproduction of color of light having a relatively narrow spectrum.

4. The image processing device according to claim 1, wherein each pixel of the image data includes information on each color of RGB.

5. An imaging apparatus comprising:
an imaging device configured to receive a component of each color of RGB to generate image data; and
the image processing device according to claim 1, configured to receive the image data to perform color conversion processing.

* * * * *